United States Patent
Takamatsu

(10) Patent No.: US 6,434,937 B2
(45) Date of Patent: Aug. 20, 2002

(54) MULTI-ENERGY SYSTEM

(75) Inventor: Masaki Takamatsu, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/854,705

(22) Filed: May 14, 2001

(30) Foreign Application Priority Data

May 18, 2000 (JP) ........................................ 2000-146645

(51) Int. Cl.[7] ................................................. F02G 1/00
(52) U.S. Cl. ............................. 60/597; 60/643; 60/670
(58) Field of Search ........................... 60/643, 670, 597

(56) References Cited

U.S. PATENT DOCUMENTS

| | | | | |
|---|---|---|---|---|
| 4,283,914 A | * | 8/1981 | Allen | 60/641.1 |
| 4,697,136 A | * | 9/1987 | Ishikawa | 323/267 |
| 4,947,657 A | * | 8/1990 | Kalmbach | 62/236 |
| 5,586,613 A | * | 12/1996 | Ehsani | 180/65.2 |
| 5,950,418 A | * | 9/1999 | Lott et al. | 60/39.182 |

* cited by examiner

Primary Examiner—Hoang Nguyen
(74) Attorney, Agent, or Firm—Darby & Darby

(57) ABSTRACT

A multi-energy system 9 including a gas heat pump type air conditioner 10 in which a compressor 16 equipped in an outdoor unit 11 is driven by a gas engine 25, and a power generating apparatus 30 having a power generator 31 which is driven by the gas engine 25 to output AC power, characterized in that the power generating apparatus 30 further includes an AC/DC converter 32 converter for converting AC power output from the power generator 31 to DC power, and a DC/AC converter 33 for converting the DC power thus obtained in the AC/DC converter 32 to AC power having a specified frequency and then outputting the AC power thus obtained to electric equipment.

6 Claims, 2 Drawing Sheets

MULTI-ENERGY SYSTEM

BACKGROUND OF THE INVENTION

1. Field of the Invention

The present invention relates to a multi-energy system which can perform an air conditioning operation, generate electric power and also supply hot water by using a gas engine.

2. Description of the Related Art

The demand of electric power reaches its peak in the summer season. However, the overall use efficiency of the primary energy in Japan has been low in the summer season because the availability factor of power plants is low. For the purpose of cutting the peak in the summer season, a gas heat pump type air conditioner in which a compressor is driven by using a gas engine has been popularly used.

FIG. 1 shows a conventional gas heat pump type air conditioner 101. The conventional gas heat pump type air conditioner 101 is equipped with a compressor 103, a four-way valve 105, an outdoor heat exchanger 106, an outdoor expansion valve 107, indoor expansion valves 108, indoor heat exchangers 109 and an accumulator 110, which are successively connected through a refrigerant pipe 104 to the compressor 103 in this order, and also equipped with a gas engine 102 for driving the compressor 103.

In the gas heat pump type air conditioner 101, when the four-way valve 105 is switched to its cooling side, the outdoor heat exchanger 106 and each indoor heat exchanger 109 function as a condenser and an evaporator respectively to perform cooling operation. On the other hand, when the four-way valve 105 is switched to its heating side, the outdoor heat exchanger 106 and each indoor heat exchanger 109 function as an evaporator and a condenser respectively to perform heating operation.

The gas engine 102 is supplied with fuel gas fed from a fuel supply system 111, and actuated with the fuel gas. During the actuation of the gas engine 102, the waste heat of the gas engine 102 is transferred to a discharge gas heat exchanger 112 to be heat-exchanged with engine cooling water. The engine cooling water thus heat-exchanged is circulated by a cooling water pump 113, and the heat of the engine cooling water is radiated from a radiator 114.

However, the peak-cut in the summer season cannot be implemented even by using the gas heat pump type air conditioner 101 thus constructed because the installing number of electric heat pump type air conditioners in which compressors are driven by electric motors is still increased, and thus the gap in power demand between the seasons is still large.

Further, in the gas heat pump type air conditioner 101, the waste heat of the gas engine under cooling operation is normally discharged with no use, and thus the use efficiency of energy is lower under the cooling operation. A co-generation system has been proposed from the viewpoint of the use efficiency of energy. According to the co-generation system, a gas engine is actuated to drive a power generating apparatus for generating electric power, and at the same time the waste heat of the engine is withdrawn to heat water and then supply hot water thus obtained.

In the co-generation system, however, when a power-generating load is high and a hot-water supplying load is low, that is, when these loads are unbalanced with each other, the waste heat of the engine cannot be sufficiently withdrawn and thus the use efficiency of energy is low.

Further, when the power generation is continuously carried out by actuating the engine and the hot water supplying operation is properly carried out in the co-generation system, a part of required power demand is furnished over year by the co-generation system, and thus the gap in power demand between the seasons cannot be still moderated.

SUMMARY OF THE INVENTION

The present invention has been implemented in view of the foregoing situation, and has an object to provide a multi-energy system which can moderate the gap in power demand between seasons.

In order to attain the above object, according to the present invention, a multi-energy system including a gas heat pump type air conditioner in which a compressor equipped in an outdoor unit is driven by a gas engine, and a power generating apparatus having a power generator which is driven by the gas engine to output AC power, is characterized in that the power generating apparatus further includes a first converter for converting AC power output from the power generator to DC power, and a second converter for converting the DC power thus obtained in the first converter to AC power having a specified frequency and then outputting the AC power thus obtained to electric equipment.

The above multi-energy system further includes a hot water supplying apparatus for withdrawing the waste heat of the gas engine to heat water and supplying hot water thus obtained.

In the above multi-energy system, the hot water supplying apparatus includes a hot water tank for accumulating the waste heat of the gas engine in the form of hot water.

In the above multi-energy system, the hot water supplying apparatus further includes a discharge gas heat exchanger for heat-exchanging the waste heat of the discharge gas from the gas engine with engine cooling water, a cooling water pump for circulating the engine cooling water, and an intermediate heat exchanger for heat-exchanging the engine cooling water with heat medium, the heat medium being heat-exchanged with water in the hot water tank to obtain the hot water.

In the above multi-energy system, the power generating apparatus outputs the AC power in the hot water supplying operation of the hot water supplying apparatus.

In the above multi-energy system, the power generating apparatus outputs the AC power in the cooling or heating operation of the gas heat pump type air conditioner.

According to the present invention, the gas heat pump type air conditioner is actuated by the gas engine to perform the air conditioning operation, and the power generator of the power generating apparatus is drive by the same gas engine to output AC power having a specified frequency through the first and second converters, so that an air conditioner having a compressor driven by electronic equipment such as a power generator or the like can be actuated with the AC power output from the power generating apparatus. As a result, the peak-cut of the power demand, particularly in the summer season, can be implemented, and thus the gap in power demand between the seasons can be moderated.

Further, the rotational frequency of the gas engine is varied due to variation of an air conditioning load of the gas heat pump type air conditioner, and thus the output power from the power generator driven by the gas engine is also varied. However, the AC power output from the power generator is temporarily converted to the DC power by the first converter, and then the DC power is converted to the AC power having the specified frequency. Therefore, the AC power output from the power generating apparatus can be systematically linked to commercial power, that is, the AC power can be used as commercial power, and thus normal electric equipment can be actuated with the AC power output from the power generating apparatus.

Still further, during the actuation of the gas engine, the hot water supplying apparatus is driven by using the waste heat of the gas engine to make water hot, so that the use efficiency of energy can be enhanced.

Still further, through the actuation of one gas engine, the air conditioning operation is carried out by the gas heat pump type air conditioner, electric equipment is actuated by using the power generating apparatus, and water is made hot by using the hot water supplying apparatus. Therefore, the energy can be excellently efficiently used.

Still further, the hot tank for accumulating the waste heat of the gas engine in the form of hot water is disposed in the hot water supplying apparatus, and thus hot water obtained in the hot water supplying apparatus can be used at any time when it is needed.

DETAILED DESCRIPTION OF THE PREFERRED EMBODIMENT

A preferred embodiment according to the present invention will be described hereunder with reference to the accompanying drawings.

Figure 1:
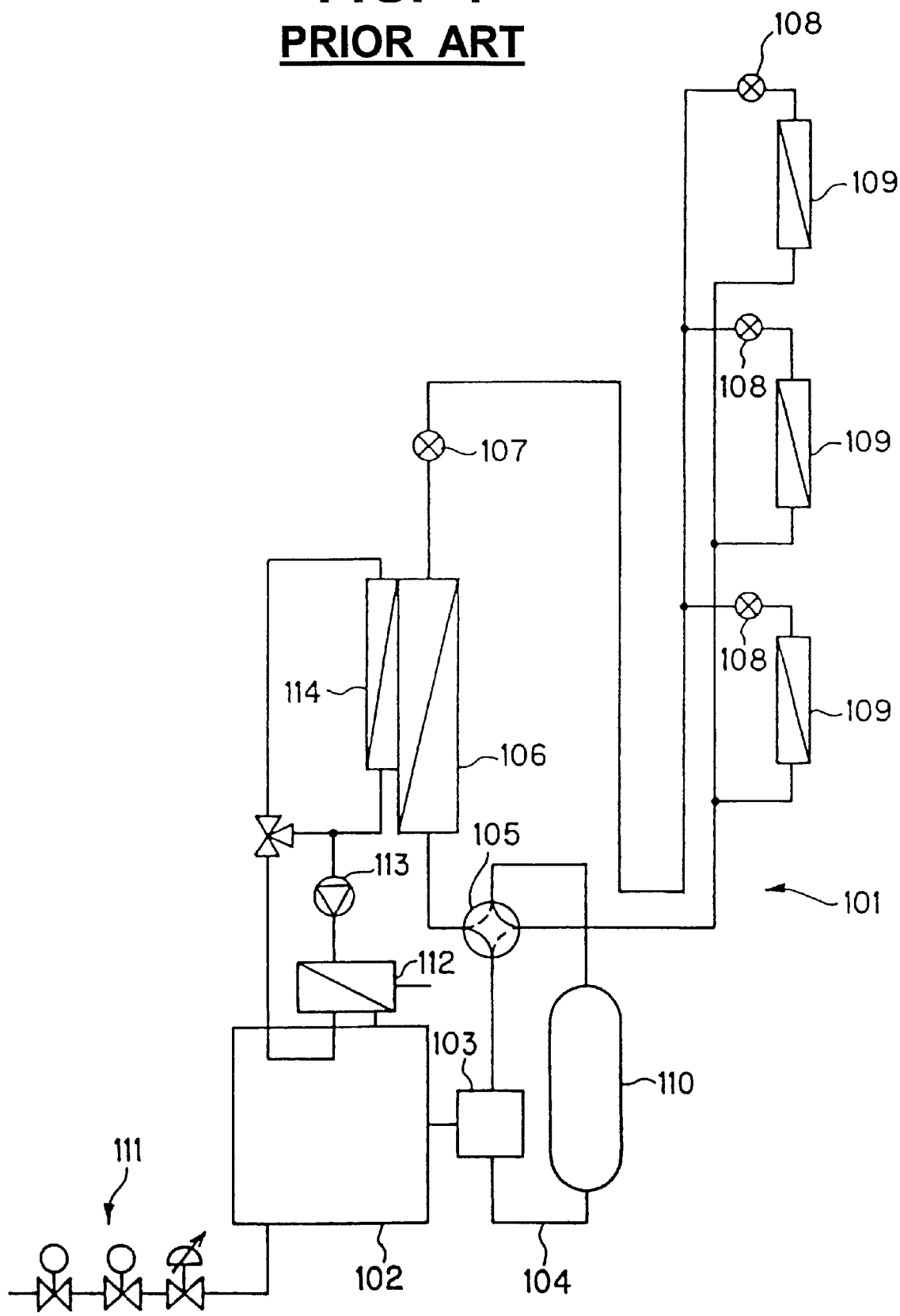
FIG. 1 is a systematic diagram showing a conventional gas heat pump type air conditioner.
Figure 2:
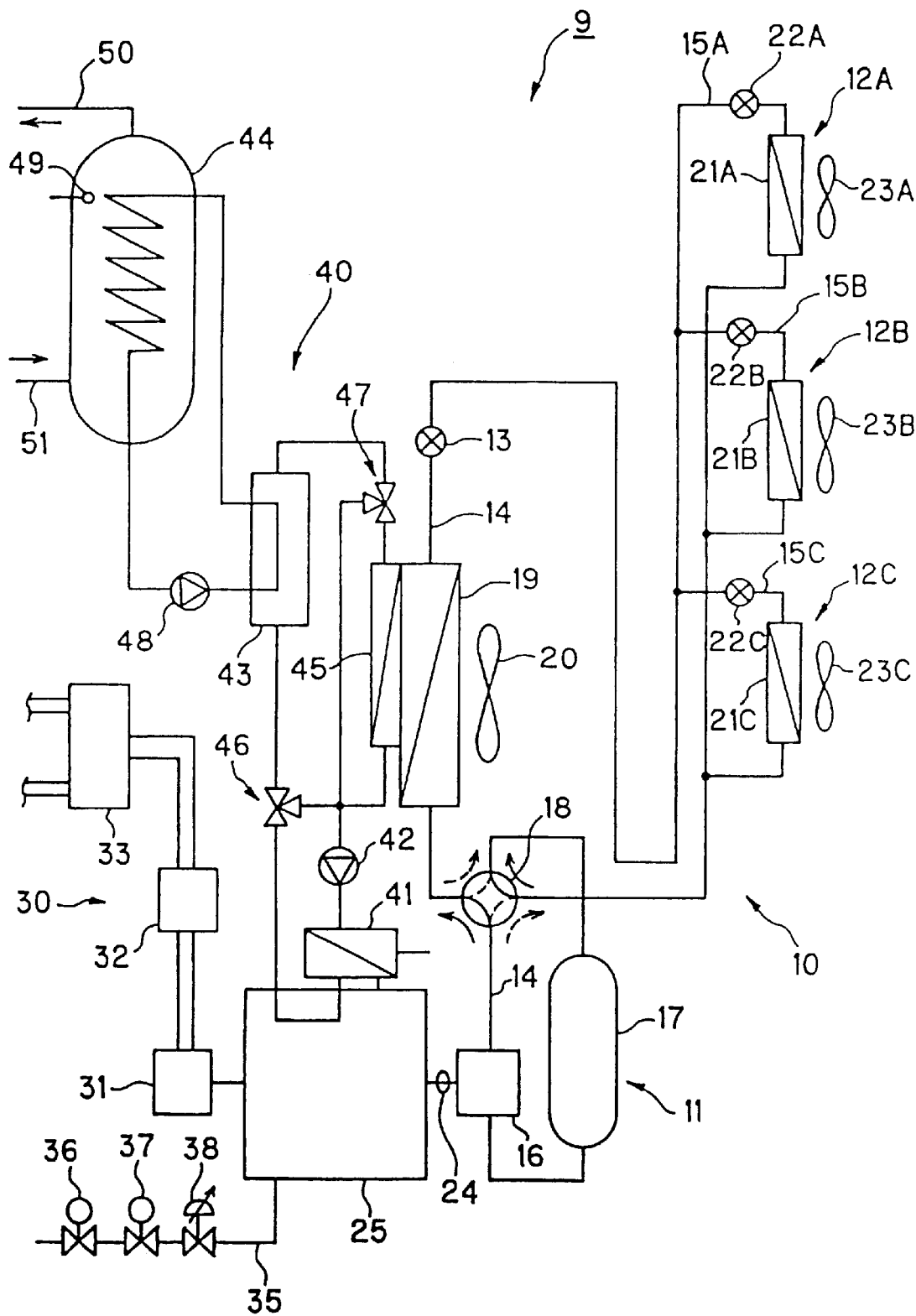
FIG. 2 is a systematic diagram showing an embodiment of a multi-energy system according to the present invention.

FIG. 2 is a systematic diagram showing an embodiment of a multi-energy system according to the present invention.

The multi-energy system 9 shown in FIG. 2 includes a gas heat pump type air conditioner 10 in which a compressor 16 is driven by a gas engine 25, a power generating apparatus 30 for outputting AC power by using the driving force of the gas engine 25, and a hot water supplying apparatus 40 for withdrawing the waste heat of the gas engine 25 to heat water and obtain hot water.

The gas heat pump type air conditioner 10 has an outdoor unit 11 and plural (for example, three) indoor units 12A, 12B and 12C connected to the outdoor unit 11. The outdoor refrigerant pipe 14 of the outdoor unit 11 is connected to the indoor refrigerant pipes 15A, 15B and 15C of the indoor units 12A, 12B and 12C.

The outdoor unit 11 is disposed outdoors. The outdoor unit 11 includes a compressor 16 disposed in the outdoor refrigerant pipe 14, an accumulator 17 connected to the suction side of the compressor 16, a four-way valve 18 connected to the discharge side of the compressor 16, an outdoor heat exchanger 19 disposed at the side of the four-way valve 18, and an outdoor expansion valve 13 connected to the outdoor heat exchanger 19. An outdoor fan 20 for blowing air to the outdoor heat exchanger 19 is disposed in proximity to the outdoor heat exchanger 19. The compressor 16 is connected to the gas engine 25 through a flexible coupling 24, and it is driven by the gas engine 25.

On the other hand, the indoor units 12A, 12B and 12C are disposed indoors. In the indoor units 12A, 12B, 12C, indoor heat exchangers 21A, 21B, 21C are disposed in indoor refrigerant pipes 15A, 15B, 15c, and indoor expansion valves 22A, 22B, 22C are disposed so as to be adjacently connected to the indoor heat exchangers 21A, 21B, 21C in the indoor refrigerant pipes 15A, 15B, 15C, respectively. Further, indoor fans 23A, 23B, 23C for blowing air to the indoor heat exchangers 21A, 21B, 21C are disposed in proximity to the indoor heat exchangers 21A, 21B, 21C.

The operation mode of the gas heat pump type air conditioner 10 is selectively set to a cooling operation mode or a heating operation mode by switching the four-wave valve 18 to its cooling side or heating side. That is, when the four-way valve 18 is switched to the cooling side, refrigerant flows in the direction indicated by a solid-line arrow. In this case, the refrigerant is reduced in pressure by the indoor expansion valves 22A, 22B, 22C, and the outdoor heat exchanger 19 functions as a condenser while the indoor heat exchangers 21A, 21B, 21C function as evaporators, whereby the air conditioner is set to the cooling operation mode. Therefore, rooms are cooled by the respective indoor heat exchangers 21A, 21B, 21C.

On the other hand, when the four-way valve 18 is switched to the heating side, the refrigerant flows in the direction indicated by a broken-line arrow. In this case, the refrigerant is reduced in pressure by the outdoor expansion valve 13 and the indoor expansion valves 22A, 22B, 22C, and the indoor heat exchangers 21A, 21B, 21C function as condensers while the outdoor heat exchanger 19 functions as an evaporator, whereby the air conditioner is set to the heating operation mode. Therefore, the rooms are heated by the respective indoor heat exchangers 21A, 21B, 21C.

A fuel supply pipe 35 is connected to the gas engine 25, and a fuel adjusting valve 38, a zero governor 37 and a fuel intercepting valve 36 are successively connected in this order through the fuel supply pipe 35 to the gas engine 25.

By fully closing or fully opening the fuel intercepting valve 36, the interception of fuel gas to the gas engine 25 with no leakage or the supply of the fuel gas into the gas engine 25 is selected. The zero governor 37 functions to stabilize the combustion in the gas engine 25 by adjusting the pressure of the fuel gas in the fuel supply pipe 35 at the side of the fuel adjusting valve 38 so that the pressure of the fuel gas is fixed to a constant value even when the pressure of the fuel gas in the fuel supply pipe 35 at the side of the fuel intercepting valve 36 is varied. Further, the fuel adjusting valve 38 adjusts the air fuel ratio of the mixture gas generated by mixing the fuel gas and air so that the air fuel ratio is equal to a proper value.

The hot water supplying apparatus 40 includes a discharge gas heat exchanger 41 for heat-exchanging the waste heat of discharge gas discharged from the gas engine 25 with engine cooling water, a cooling water pump 42 for circulating the engine cooling water, an intermediate heat exchanger 43 for heat-exchanging the engine cooling water with heat medium (for example, water, brine or the like), a hot water tank 44 for heat-exchanging the heat medium with using water to heat the using water and obtain hot water and then stocking the hot water thus obtained, a radiator 45 for radiating the heat of the engine cooling water, first and second wax three-way valves 46 and 47, and a heat medium pump 48.

The cooling water pump 42 is normally driven at all times during actuation of the gas engine 25. When the gas engine 25 is started, the temperature of the engine cooling water is low (for example, about 70° C. or less). Therefore, the engine cooling water is circulated in a circulating passage through which the engine cooling water is successively passed through the cooling pump 42, the discharge gas heat exchanger 41, the gas engine 25 and the first wax three-way valve 46 and then returned to the cooling pump 42, thereby heating the gas engine 25.

When the waste heat of the gas engine 25 is withdrawn and the temperature of the engine cooling water rises up to about 70° C. or more (and about 80° C. or less, for example), the engine cooling water is circulated in a circulating passage through which the engine cooling water is successively passed through the cooling water pump 42, the discharge gas heat exchanger 41, the gas engine 25, the first wax three-way valve 46, the intermediate heat exchanger 43 and the second wax three-way valve 47 and then returned to the cooling water pump 42, thereby cooling the gas engine 25. When the engine cooling water rises up to about 70° C. or more as described above, the heat medium pump 48 is driven to circulate the heat medium, and the heat medium thus circulated is heated through the intermediate heat exchanger 43, whereby the using water is heated through the hot water tank 44 and it can be stocked as hot water in the hot water tank 44. That is, the waste heat of the gas engine 25 is accumulated in the form of hot water in the hot water tank 44.

For example when the temperature of the engine cooling water rises up to about 80° C. or more, the engine cooling water is successively passed through the cooling water pump 42, the discharge gas heat exchanger 41, the gas engine 25, the first wax three-way valve 46, the intermediate heat exchanger 43, the second wax three-way valve 47 and the radiator 45 and then returned to the cooling water pump 42 to cool the gas engine 25. In addition, hot water is stocked in the hot water tank 44 and the extra heat of the engine cooling water is radiated from the radiator 45.

As described later, a temperature sensor 49 for detecting the temperature of hot water stocked in the hot water tank 44 is disposed in the hot water tank 44 of the hot water supplying apparatus 40. A supply line 50 for supplying hot water from the hot water tank 44 to the outside is connected to the hot water tank 44, and heating means (for example, a boiler, an instantaneous water heater or the like) for heating the hot water flowing through the supply line 50 may be disposed in the supply line 50. Reference numeral 51 represents an incoming line through which using water is fed into the hot water tank 44.

The power generating apparatus 30 includes a power generator 31, an AC/DC converter 32 serving as a first converter, and a DC/AC converter 33 serving as a second converter. The power generating apparatus 30 converts a part of the shaft output of the gas engine 25 to electric energy during actuation of the gas engine 25 and outputs the electric energy as AC power.

The power generator 31 is integrally rotatably linked to the rotational shaft of the gas engine 25 to generate AC power. The AC/DC converter 32 temporarily converts the AC power thus generated in the power generator 31 to DC power. The DC/AC converter 33 converts the DC power thus converted by the AC/DC converter 32 to AC power having a specified frequency (for example, 50Hz or 60Hz), and outputs the AC power having the specified frequency to various electric equipment (not shown).

The AC/DC converter 32 and the DC/AC converter 33 are provided for the following reason. That is, since the rotational frequency of the gas engine 25 is varied in accordance with the variation of an air conditioning load of the gas heat type air conditioner 10, the AC power output from the power generator 31 is also varied. However, since the AC power output from the power generator 31 is temporarily converted to the DC power by the AC/DC converter 32 and then the DC power is subsequently converted to AC power having a specified frequency by the AC/DC converter 32, the AC power output from the power generating apparatus 30 can be systematically linked to the commercial power i.e., the AC power generated in the power generating apparatus 30 can be used as commercial power).

The power generating apparatus 30 is designed to generate power when the gas heat pump type air conditioner 10 carries out the cooling or heating operation or when the hot water supplying apparatus carries out the hot water supply operation.

That is, when the gas heat pump type air conditioner 10 carries out the cooling operation, the flexible coupling 24 is set to the coupling state, the gas engine 25 is actuated and the four-way valve 18 is switched to the cooling side, whereby the gas heat pump type air conditioner 10 carries out the cooling operation. At the same time, the power generator 31 of the power generating apparatus 30 is actuated, and the power generating apparatus 30 outputs the AC power having the specified frequency through the AC/DC converter 32 and the DC/AC converter 33.

In addition, when the temperature of the engine cooling water in the hot water supplying apparatus 40 rises up to 70° C. or more under the cooling operation of the gas heat pump type air conditioner 10, the heat medium pump 48 is actuated, and the using water in the hot water tank 44 is heated through the intermediate heat exchanger 43 and the heat medium, thereby obtaining hot water.

On the other hand, when the gas heat pump type air conditioner 10 carries out the heating operation, the flexible coupling 24 is likewise set to the coupling state, the gas engine 25 is actuated and the four-way valve 18 is switched to the heating side, whereby the gas heat pump type air conditioner 10 carries out the heating operation. At this time, the power generator 31 of the power generating apparatus 30 is actuated, and the power generating apparatus 30 outputs the AC power having the specified frequency through the AC/DC converter 32 and the DC/AC converter 33. In addition, the hot water is also obtained in the hot water tank 44 under the heating operation of the gas heat pump type air conditioner 10 as in the case of the cooling operation.

The hot water supplying operation of the hot water supplying apparatus 40 is carried out when the cooling or heating operation of the gas heat pump type air conditioner 10 is not carried out. Therefore, during the hot water supplying operation of ht hot water supplying apparatus 40, the flexible coupling 24 is set to the intercepting state. In the hot water supplying operation, when it is detected by the temperature sensor 49 that the temperature of the hot water (or using water) in the hot water tank 44 is reduced to, for example, about 60° C. or less, the gas engine 25 is actuated. On the other hand, when the temperature of the engine cooling water rises up to, for example, about 70° C. or more, the heat medium pump 48 is actuated, whereby the hot water (or using water) in the hot water tank 44 is heated to obtain hot water having a temperature of 60° C. or more.

At this time, at the stage that the gas engine 25 is actuated under the hot water supplying operation of the hot water supplying apparatus 40, the power generator 31 of the power generating apparatus 30 is actuated, and the AC power having the specified frequency is output by the actions of the power generator 31 and the AC/DC converter 32.

Accordingly, the above embodiment provides the following effects (1) to (5).

(1) The gas heat pump type air conditioner 10 is actuated by the gas engine 25 to carry out the air conditioning operation, and the power generator 31 of the power generating apparatus 30 is driven by the same gas engine 25 to output AC power having a specified frequency by using the AC/DC converter 32 and the DC/AC converter 33, so that electric equipment, for example, an air conditioner (electronic heat pump type air conditioner) having a compressor driven by an electric motor can be actuated with the AC power output from the power generating apparatus 30. As a result, the peak-cut of the power demand, particularly in the summer season, can be implemented, and thus the gap in power demand between seasons can be moderated.

(2) The rotational frequency of the gas engine 25 is varied due to variation of an air conditioning load of the gas heat pump type air conditioner 10, and thus the output power from the power generator 31 driven by the gas engine 25 is also varied. However, the AC power output from the power generator 31 is temporarily converted to the DC power by the AC/DC converter 32, and then the DC power is converted to AC power having a specified frequency by the DC/AC converter 33. Therefore, the AC power generated in the power generating apparatus 30 can be systematically linked to commercial power sources, and thus normal electric equipment containing an electric heat pump type air conditioner can be actuated.

(3) During the actuation of the gas engine 25, the hot water supplying apparatus 40 is operated to obtain hot water by using the waste heat of the gas engine 25, so that the energy can be efficiently used.

(4) The air conditioning operation of the gas heat pump type air conditioner apparatus 10 can be performed by actuating one gas engine 25, electric equipment is actuated by using the power generating apparatus 30, and hot water can be obtained by using the hot water supplying apparatus 40, so that the energy can be more efficiently used.

(5) The hot water tank 44 for accumulating the waste heat of the gas engine 25 in the form of hot water is disposed in the hot water supplying apparatus 40, so that the hot water obtained by the hot water supplying apparatus 40 can be used at any time when it is needed.

The present invention is not limited to the above embodiment, and various modifications may be made to the embodiment. For example, when hot water is supplied from the hot water tank 44 in the hot water supplying operation of the hot water supplying apparatus 40 or in the heating operation of the gas heat pump type air conditioner 10 and thus the temperature of hot water in the hot water tank 44 cannot be sufficiently increased by only the waste heat of the gas engine 25, the heating means (boiler, instantaneous water heater or the like) of the supply line 50 is actuated to increase the temperature of the hot water.

As described above, according to the present invention, in the multi-energy system including the gas heat pump type air conditioner in which the compressor equipped to the outdoor unit is drive by the gas engine, and the power generating apparatus having the power generator that is driven by the gas engine to output AC power, the power generating apparatus further includes a first converter for converting the AC power output from the power generator to DC power, and a second converter for converting the DC power obtained in the first converter to AC power having a specified frequency and then outputting the AC power to electric equipment. Therefore, the gap in power demand between seasons can be moderated.

What is claimed is:

1. A multi-energy system including a gas heat pump type air conditioner in which a compressor equipped in an outdoor unit is driven by a gas engine, and a power generating apparatus having a power generator which is driven by the gas engine to output AC power, characterized in that said power generating apparatus further includes a first converter for converting AC power output from said power generator to DC power, and a second converter for converting the DC power thus obtained in said first converter to AC power having a specified frequency and then outputting the AC power thus obtained to electric equipment.

2. The multi-energy system as claimed in claim 1, further including a hot water supplying apparatus for withdrawing the waste heat of said gas engine to heat water and supplying hot water thus obtained.

3. The multi-energy system as claimed in claim 2, wherein said hot water supplying apparatus includes a hot water tank for accumulating the waste heat of said gas engine in the form of hot water.

4. The multi-energy system as claimed in claim 3, wherein said hot water supplying apparatus further includes a discharge gas heat exchanger for heat-exchanging the waste heat of the discharge gas from said gas engine with engine cooling water, a cooling water pump for circulating the engine cooling water, and an intermediate heat exchanger for heat-exchanging the engine cooling water with heat medium, the heat medium being heatexchanged with water in said hot water tank to obtain the hot water.

5. The multi-energy system as claimed in claim 2, wherein said power generating apparatus outputs the AC power in the hot water supplying operation of said hot water supplying apparatus.

6. The multi-energy system as claimed in claim 1, wherein said power generating apparatus outputs the AC power in the cooling or heating operation of said gas heat pump type air conditioner.

* * * * *